United States Patent
Tsubota (10) Patent No.: US 7,664,111 B2
(45) Date of Patent: Feb. 16, 2010

(54) NETWORK SWITCHING SYSTEM HAVING A CONNECTION DEVICE MANAGEMENT TABLE COMMONLY OWNED ON A WIRELESS NETWORK

(75) Inventor: Azuma Tsubota, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 513 days.

(21) Appl. No.: 11/296,395

(22) Filed: Dec. 8, 2005

(65) Prior Publication Data
US 2006/0126587 A1    Jun. 15, 2006

(30) Foreign Application Priority Data
Dec. 9, 2004   (JP)   ............... 2004-356899

(51) Int. Cl.
H04L 12/28    (2006.01)
(52) U.S. Cl. ............... 370/392; 370/395.31; 370/401
(58) Field of Classification Search ............... 370/351, 370/389, 392, 395.1, 395.31, 401; 713/62; 726/3
See application file for complete search history.

(56) References Cited

U.S. PATENT DOCUMENTS

| | | | |
|---|---|---|---|
| 5,161,192 A * | 11/1992 | Carter et al. ............... | 713/162 |
| 6,006,330 A * | 12/1999 | Soni ............... | 726/3 |
| 6,539,020 B1 * | 3/2003 | Barber et al. ............... | 370/401 |
| 6,650,642 B1 * | 11/2003 | Sugai et al. ............... | 370/392 |
| 7,280,800 B2 * | 10/2007 | Morino ............... | 455/15 |
| 2005/0083852 A1 * | 4/2005 | Alastalo et al. ............... | 370/252 |
| 2006/0122481 A1 * | 6/2006 | Sievenpiper et al. ............... | 600/407 |
| 2007/0064700 A1 * | 3/2007 | Holness ............... | 370/392 |

FOREIGN PATENT DOCUMENTS

| | | |
|---|---|---|
| CN | 1167227 | 5/2003 |
| JP | 2005-184522 | 7/2004 |

OTHER PUBLICATIONS

Toshio Koide, "Sixth OLSSR (Optimized Link State Routing) Protocol", [On-line], Apr. 16, 2003, Internet Watch, retrieved on Sep. 17, 2004, on the website, http://internet.watch.impress.co.jp/www/column/wp2p/wp2p06.htm.
Toshio Koide, "Seventh AODV (Ad hock On-Demand Distance Vector) Protocol" [On-line], Internet Watch, retrieved on Sep. 17, 2004, on the website, http://internet.watch.impress.co.jp/www/column/wp2p/wp2p07.htm.

* cited by examiner

*Primary Examiner*—Kwang B Yao
*Assistant Examiner*—Jeffrey M Rutkowski
(74) *Attorney, Agent, or Firm*—Venable LLP; Michael A. Sartori; Yao Wang (57) ABSTRACT

The network switching system is provided with a communication route management table for managing transmission path information of a wireless network including wireless access devices, and a connection device management table for managing, in common on the wireless network, the information on wireless network devices connected to the wireless access devices. The system is further provided with a signal transmitter for referencing the two tables, and generating a signal frame depending on the destination of communication signals received to transmit the signal frame generated. Communication is prevented from being interrupted when communication route information is updated, and from being invaded on a communication route in the network. The network system is more efficiently utilized.

12 Claims, 7 Drawing Sheets

| DESTINATION AP ID | INTERFACE | RELAY DEVICE ID | |
|---|---|---|---|
| IP ADDRESS OF AP 2-2 | TRANSCEIVER 21-1 | | ~107 |
| IP ADDRESS OF TRANSCEIVER 21-3 OF AP 3-3 | TRANSCEIVER 21-1 | IP ADDRESS OF AP 2-2 | ~109 |

| MAC ADDRESS | CONNECTION AP ID |
|---|---|
| MAC ADDRESS OF WIRELESS LAN DEVICE 3-1 | ID NAME OF AP 2-1 |
| MAC ADDRESS OF WIRELESS LAN DEVICE 3-3 | ID NAME OF AP 2-3 |

NETWORK SWITCHING SYSTEM HAVING A CONNECTION DEVICE MANAGEMENT TABLE COMMONLY OWNED ON A WIRELESS NETWORK

BACKGROUND OF THE INVENTION

1. Field of the Invention

The present invention relates to a network switching system, and more particularly to a network switching system applicable to a wireless or mobile network system.

2. Description of the Background Art

In a wireless network system, for example, access control between plural wireless network devices is managed by a wireless access device, called as access point-device. In general, the access point device is disposed on a wired network for connection to an external network or to other access point devices. Hence, there was raised a problem that no access point devices may be provided under the situation, for example, where a wired network cannot-be laid, with the result that it is not possible to construct a wireless network connectable to an external network.

For overcoming this inconvenience, a wireless mesh network has now been proposed, in which a plurality of access point devices are arranged in the form of meshes, and are interconnected by wireless channels with the connections implemented by wired circuits minimized so as to attain a broader service area connectable to the network, as taught by Japanese patent laid-open publication No. 2005-184522.

In a wireless network, in order to set up both-way transmission between plural wireless network devices, it is necessary to determine a transmission path between the devices. The conventional methods of determining transmission paths between wireless network devices include, for example, ones based upon a proactive OLSR (Optimized Link State Routing) protocol or a reactive AODV (Ad hoc On-demand Distance Vector) protocol, which are respectively taught by Toshio KOIDE, "Sixth OLSR (Optimized Link State Routing) protocol," and Toshio KOIDE, "Seventh AODV (Ad hoc On-demand Distance Vector) protocol."

However, with the conventional method of deciding transmission paths, all the devices included in a network are possibly involved in a transmission path. That causes not only the access point devices but also the wireless network devices to be possibly involved in the transmission path.

For example, when a wireless network or mobile device moves, an access point device to be connected maybe replaced. If an access point is added or removed, then information on transmission paths may be updated accordingly. In addition to that, information on transmission paths for the wireless network devices provided at a distal end also has to be updated. That may cause transmission to be temporarily interrupted.

In general, a wireless mesh network is structured with either one of the two features: (a) each access point device forms a particular network separate in segment from others, and (b) a network formed between a wireless network device and an access point device is common to a network formed between access point devices.

However, with a network structured with the feature (a), when a wireless network or mobile device moves from one access point device interconnected thereto to a service area covered by another access point device, the wireless network device has to update data of the IP address stored to that of the other access point device, with the result that the network connection is interrupted and will not be available until a network connection is re-established.

On the other hand, in a network structured with the feature (b), plural networks co-exist each of which conveys a particular sort of communication different from each other in characteristics, such as speed of transmission or strength of the electrical field. Usually, efficient utilization of a certain network requires various parameters thereof to be tuned. Where plural sorts of networks co-exist as with the feature (b), the situation becomes more complex to the extent that it is difficult to select optimum parameters, thus deterring the efficient use of the network.

There is also raised a security-related problem that, communication between wireless network devices allows other, strange radio network devices to readily monitor transmission paths between the access point devices in the wireless network.

For these reasons, there has been raised a demand for a network switching system, in which communication may be carried out without being affected by settings of remote devices on communication between wireless network devices or between access points, and communication protocols or standards, aiming at preventing disconnection of transmission otherwise caused by updating transmission path information resultant from addition or removal of an access point device or movement of a wireless network device from one to another service area, and invasion into a transmission path from strange mobile devices, as well as achieving more efficient utilization of the network system.

SUMMARY OF THE INVENTION

It is therefore an object of the present invention to provide an improved network switching system capable of efficiently utilizing network resources.

The present invention provides, in its first aspect, a network switch apparatus comprising a communication route management table for managing communication route information on a wireless network, the wireless network including a plurality of wireless access devices, a connection device management table for managing, in common on the wireless network, information on wireless network devices to be connected to the wireless access devices, and a signal transmitter for referencing the connection device management table and the communication route management table and to generate a signal frame depending on a destination to which a communication signal received is destined, and for transmitting the generated signal frame.

The present invention also provides, in its second aspect, a method of switching a wireless network, comprising the steps of preparing a communication route management table for managing communication route information of a wireless network, the wireless network including a plurality of wireless access devices, preparing a connection device management table for managing, in common on the wireless network, information on wireless network devices to be connected to the wireless access devices, and referencing the connection device management table and the communication route management table to generate a signal frame depending on a destination to which a communication signal received is destined, and transmitting the signal frame generated.

The present invention also provides, in its third aspect, a wireless access device including the network switch apparatus in accordance with the first aspect of the invention, the wireless access device performing access control with a communication layer with the wireless access devices other than the wireless access device in which the apparatus is included separate from a communication layer with the wireless network devices connectable to the wireless access device in which the apparatus is included.

The present invention also provides, in its fourth aspect, a wireless network system including a plurality of wireless access devices each connectable to a wireless network device, wherein the wireless access device is defined by the third aspect of the invention.

With the network switching system according to the present invention, the communication layer for communication between wireless access devices and the communication layer for communication between wireless network devices may be handled separately from each other. It is therefore possible to prevent communication from being disconnected, which would otherwise be caused by updating the communication route information, and to prevent a communication route in the communication network from being invaded. Also, the resources of the network system is more efficiently utilized.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

With reference to the drawings, a preferred embodiment of the network switching system applied to a wireless network in accordance with of the present invention will be describe in detail. With the illustrative embodiment, a wireless access apparatus in accordance with the invention is applied to a wireless local area network (LAN) access point device contained in a LAN system formed into a wireless mesh network.

Figure 1:
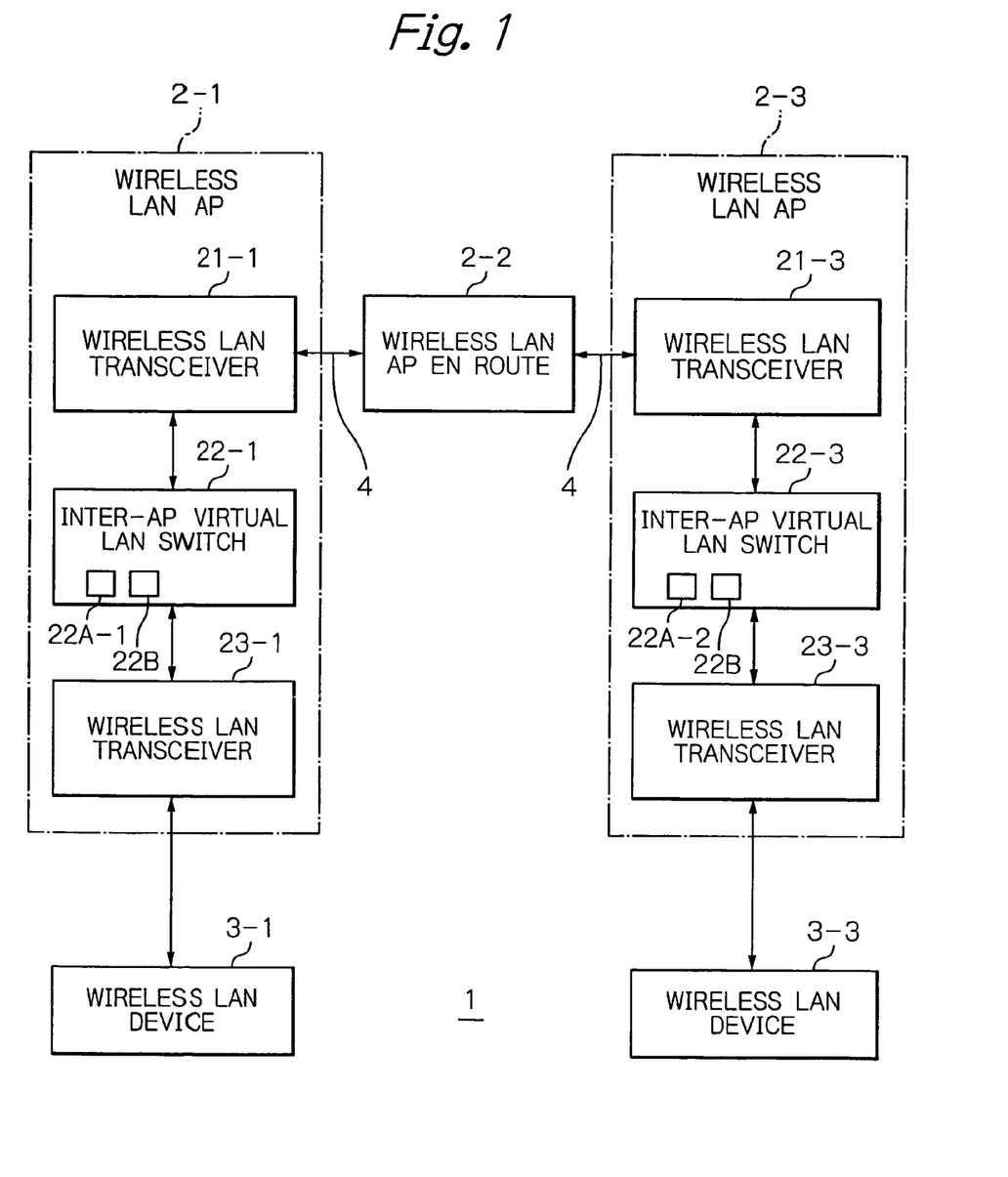
FIG. 1 is a schematic block diagram showing a simplified model of a wireless local area network (LAN) system with an inner structure of the wireless LAN access points depicted according to an embodiment of the present invention.

FIG. 1 depicts a simplified configuration of a wireless LAN system 1 including wireless LAN access point devices 2 with the inner structure thereof specifically illustrated. The wireless LAN system 1 of the present embodiment is formed into a wireless mesh network in which plural wireless LAN access point devices, sometimes referred to below simply as access points, 2, are arranged in meshes. Across these access points, communication is established by wireless transmission.

As seen from FIG. 1, the wireless LAN system 1 of the embodiment comprises plural access point devices 2, specifically shown with reference numerals 2-1, 2-2 and 2-3. The access point devices 2-1 and 2-3 have wireless communication with plural wireless LAN devices 3-1 and 3-3 staying in the respective service areas which allow for communication therewith. It is noted that FIG. 1 shows a highly schematic network configuration for the wireless LAN devices 3-1 and 3-3 to communicate with each other. Hence, on a transmission path 4 between the access points 2-1 and 2-3, FIG. 1 simply shows only one access point 2-2 involved for relaying between the access points 2-1 and 2-3. However, there may of course be involved plural intervening access points on the transmission path 4.

The access points 2-1, 2-2 and 2-3, generally designated with the reference numeral 2, are adapted to transmit a beacon signal at predetermined time intervals. Corresponding one of the wireless LAN devices 3-1 and 3-2, when having received the beacon signal, transmits a signal toward that access point 2 in response. The wireless LAN devices, or mobile devices, 3-1 and 3-2 will sometimes correspondingly designated with the general reference numeral 3. The access point 2 in turn receives the signal from the wireless LAN device 3 to detect that the wireless LAN device 3 to connect stays in its service area, thus performing access control for the wireless transmission of the wireless LAN device 3.

The access point 2 has the function of acquiring a MAC address contained in the header information of a signal, specifically a MAC frame, received from the wireless LAN device 3 connected thereto to manage the MAC address. As will be described in detail subsequently in connection with the manner of managing the MAC address by the access point 2, this MAC address is made associated with an IP (Internet Protocol) address of the access point 2 in question. In order that information defining the relationship of the IP address of the access point device in question 2 with the MAC address of the wireless LAN device 3 connected thereto is made commonly owned by all other access point devices located on the wireless LAN system 1, the access point in question 2 transfers that information to nearby access points 2 positioned therearound.

There are a variety of methods of making such information commonly owned by the totality of the access points 2. With the illustrative embodiment, the access point device 2 makes use of the flooding function. The flooding function is of unanimously distributing the same information to all access points. The flooding function may be implemented by a variety of methods, based upon the OLSR or AODV protocol stated earlier. The invention is not limited to the two methods but any other methods may be used insofar as they allows tables defining the above-mentioned information to be delivered to all the access points 2.

As seen from FIG. 1, the access points 2-1 and 2-3, respectively include wireless LAN transceivers 21-1 and 21-3, for wireless mesh network side, inter-access-point (AP) virtual LAN switches 22-1 and 22-3, and other wireless LAN transceivers 23-1 and 23-3 for wireless LAN device side, which are interconnected as illustrated. With the illustrative embodiment, the access points 2-1, 2-2 and 2-3 have the same structure as each other. Hence, when description is made on the configuration or operation of those devices 2-1, 2-2 and 2-3, common to each other, the numerals following the hyphens of those reference numerals designating the devices 2-1, 2-2 and 2-3 and the structural elements included therein will be dispensed with for convenience. For example, the LAN transceivers 21-1, 21-2, not shown, and 21-3 are sometimes represented by the reference numeral 21.

The wireless mesh network side LAN transceiver, referred to below as network side transceiver, 21 is adapted to receive communication data, or MAC frame, transmitted from another access point 2 in accordance with a communication system or scheme prescribed on the network, and transfer the so received communication data to the inter-AP virtual LAN switch 22. The network side transceiver 21 is also adapted to receive communication data from the inter-AP virtual LAN switch 22 to transmit the communication data in accordance with the prescribed communication system.

The inter-AP virtual LAN switch 22 is adapted to virtually establish a full mesh network to another access point 2 connected to the wireless mesh network, and adjusts the structure of a data frame of communication data so as to enable interconnection to the access point 2.

The inter-AP virtual LAN switch 22 at least includes the frame recognizing function of recognizing the destination of transmission, based on the header information of the received communication data, or MAC frame. The LAN switch 22 further includes the function of determining, when the transmission is destined to another wireless LAN or mobile device 3, which access point 2 is connected to the other wireless LAN device 3 to which the communication data to be transmitted is destined, and the frame formulating function of formulating a frame of communication data for enabling the data to be transmitted to the access point 2 thus determined. The LAN switch 22 also includes the function of transmitting the communication data of the frame formulated, and the table update function of updating the tables, as will be described subsequently.

The inter-AP virtual LAN switch 22 includes a routing table 22A and a MAC address management table 22B, and is adapted to use at least these two tables 22A and 22B to formulate a data frame. This establishes a virtual network to accomplish communication between the two access points 2.

The routing table 22A contains information on transmission paths, or communication routes, interconnecting the access points 2 included in the wireless mesh network 1. To the routing table 22A, applicable is a routing table specifically formulated on a particular access point 2. There is therefore how to formulate the routing table 22A is not particularly limited to but may be specific to the access point 2. As an exemplary method of formulating the routing table 22A, it may be advisable to use e.g. an OLSR or AODV protocol stated earlier.

The MAC address management table 22B contains management information on which of the access points 2 the wireless LAN device 3 is in connection with. The address management table 22B is owned in common by all of the access points 2 on the wireless LAN system 1. This table, owned in common by all access points 2, may be prepared in such a manner that the access point 2, when having detected a connection to the wireless LAN or mobile device 3, floods the information correlating the MAC address of that wireless LAN device 3, connected thereto, with the IP address of the device in question 2, and then all the remaining access points 2 formulate and update the MAC address management table 22B thereof.

Figure 2:
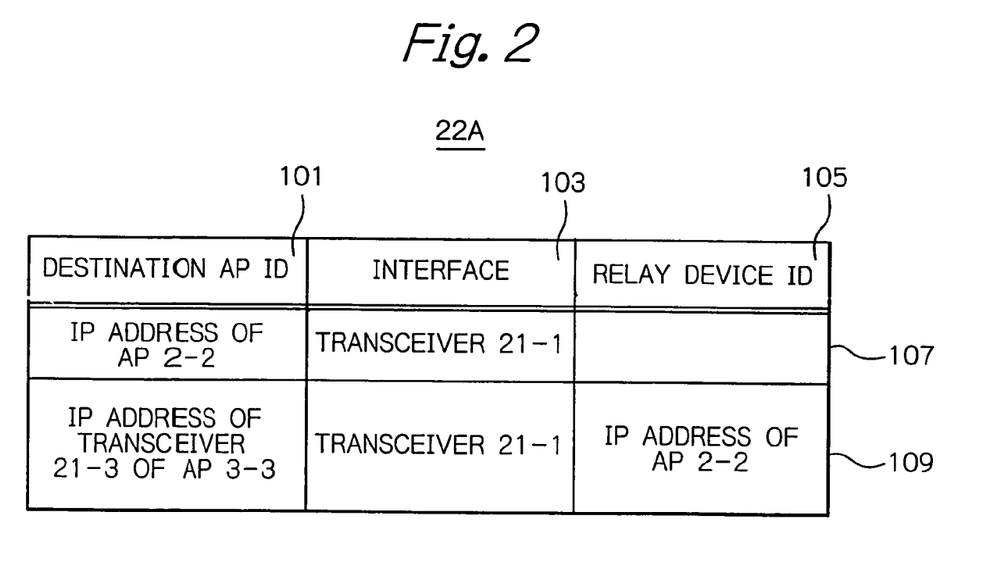
FIG. 2 is a diagrammatic view showing exemplary items and contents of a routing table included in the illustrative embodiment shown in FIG. 1.

FIG. 2 shows exemplary items and contents of the routing table 22A, which is owned by the access point 2-1. As seen from the figure, the items of the routing table 22A of the present embodiment include, for example, the identification (ID) information 101 on the access point 2 of a destination, the interface information 103 and the device identification information 105 for relaying to the access point 2 of the destination.

For example, the first line 107 of the exemplary contents of FIG. 2 stands for a case where the destination of transmission of transmission data is the access point 2-2. In that case, there is indicated the IP address of the access point 2-2 in the identification information column 101 for the destination access point, while there is indicated the network side transceiver 21-1, in the interface information column 103, by way of the routing information. Thus, the AP-side virtual LAN switch 22-1 references this routing information 107, and donates the transmission data to the network side transceiver 21-1 in order to send out the transmission data to the access point 2-2.

The second line 107 of the exemplary contents of FIG. 2 stands for a case where transmission data are destined to the specific access point 2-3. In the instant case, there are indicated, by way of the routing information, the IP address of the network side LAN transceiver 21-3 of the access point 2-3, the network side transceiver 21-1 and the IP address of the access point 2-2, in the columns 101, 103 and 105, respectively, of the identification information of the destination access point, the interface and the relay device identification information. The inter-AP virtual LAN switch 22-1 references this routing information. In order to send transmission data to the network side transceiver 21-3 of the access point 2-3, the transmission data need to initially be transmitted to the access point 2-2. Therefore, the inter-AP virtual LAN switch 22-1 sends the data for transmission to the network side transceiver 21-1, in order to transmit the data to the access point 2-2.

Figure 3:
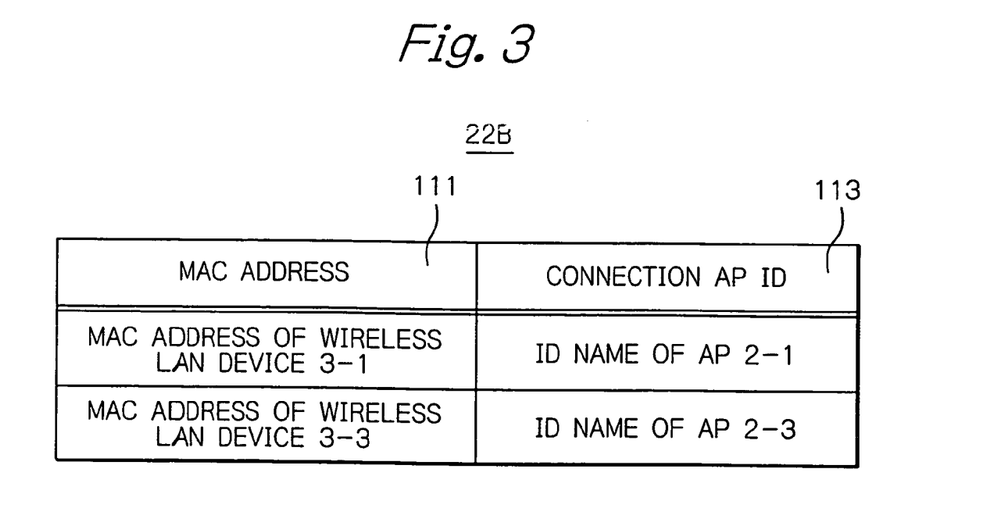
FIG. 3 is also a diagrammatic view showing exemplary items and contents of a MAC (Media Access Control) address management table of the illustrative embodiment.

FIG. 3 illustrates exemplary items and contents of the MAC address management table 22B. For example, the items of the MAC address management table 22B in FIG. 3 include the MAC addresses 111, allocated to the wireless LAN device 3, and the connection access point identification information 113. It is also seen from FIG. 3 that the wireless LAN devices 3-1 and 3-3 are connected to the access points 2-1and 2-3, respectively. On the table 22B shown in FIG. 3, the information 113 for identifying the connection access points represents the name of the access points 2. However, the IP address of the access points 2 may instead be used as the identifying information 113 provided that the IP address is able to identify a specific access point 2 connected to the wireless LAN device 3. In an application where the identification information of an access point to be connected is the name of that access point, the IP address of that access point may be acquired by making an inquiry to e.g. a domain name server (DNS) of the Internet.

The wireless LAN device side wireless LAN transceiver 23, similarly referred to below as device side transceiver 23, is adapted to receive communication data, transmitted from the wireless LAN device 3 in accordance with the communication system specific to the network, and transfer the so received communication data to the inter-AP virtual LAN switch 22. The device side wireless LAN transceiver 23 is also adapted to receive communication data from the inter-AP virtual LAN switch 22 and transmit the thus received communication data in accordance with the communication system. Although there is no limitation to the wireless transmission system applicable to the device side wireless LAN transceiver 23, the communication system prescribed by e.g. IEEE (Institute of Electrical and Electronics Engineers) 802.11, such as IEEE 802.11a, 802-11b or 802-11g, may be used.

The wireless LAN devices 3-1 and 3-3, generally designated with the reference numeral 3, is a mobile wireless communication terminal unit adapted to establish transmission via the access point 2 in accordance with the communication system specific to the network To the wireless LAN device 3, any device is broadly applicable which has a prescribed wireless communication function that may be implemented by, for example, a mobile communication or terminal device, such as a note book personal computer, a mobile data terminal, a mobile phone subscriber set, a PHS (Personal Handy Phone System) terminal or a PDA (Personal Digital Assistant) having a wireless LAN card or circuit board adapted for coping with IEEE 802.11, such as IEEE 802.11a, 802-11b or 802-11g.

In distinction from the state-of-art devices, the wireless LAN device 3 does not include a routing table. The reason is that the access point 2 includes the routing table 22A and the MAC address management table 22B, and uses these two tables to construct two networks, namely a device side network and an AP side network. More specifically, when the wireless LAN devices 3 communicate with each other, the present embodiment is adapted in such a fashion that the access point 2 to which the wireless LAN device 3 serving as the source of transmitting data is connected uses or references the routing table 22A and the MAC address management table 22B to specify the wireless LAN device 3 to which the data are to be destined.

In operation, referring first to FIG. 4, with the exemplified wireless LAN system 1, having the three access points 2-1, 2-2 and 2-3, communication will be established between the wireless LAN devices 3-1 and 3-3 in a manner to read below. As shown in the figure, the access point (AP1) 2-1 has its IP address and MAC address represented by IP_AP1 and MAC_AP1, respectively, and the access point (AP2) 2-2 has its IP address and MAC address represented by IP_AP2 and MAC_AP2, respectively. The IP address and the MAC address of the access point (AP3) 2-3 are IP_AP3 and MAC_AP3, respectively.

In addition, the IP address and the MAC address of the wireless LAN device (CL1) 3-l are IP_CL1 and MAC_CL1, respectively, and the IP address and the MAC address of the wireless LAN device (CL2) 3-2 are IP_CL2 and MAC_CL2, respectively. The wireless LAN device (CL3) 3-3 has its IP address and MAC address of IP_CL3 and MAC_CL3, respectively.

Further, the access points 2-1, 2-2 and 2-3 respectively have routing tables 22A-1, 22A-2 and 22A-3. Each routing table 22A contains, as shown in FIG. 4, the destination IP address 101 of the other access points 2 to be destined, the interface 103 associated with the access point 2 serving as the source of transmission in connection with the access point to be destined, and a gateway identification 105 representing the IP address of the access point 2 serving as a gateway interconnecting the destination and source sides of the access point in question 2. In addition, the access points 2 have the MAC address management table 22B which includes the MAC address 111 of the wireless LAN devices and the IP address 113 of the access point 2 to which the wireless LAN device 3 in question is connected.

Figure 4:
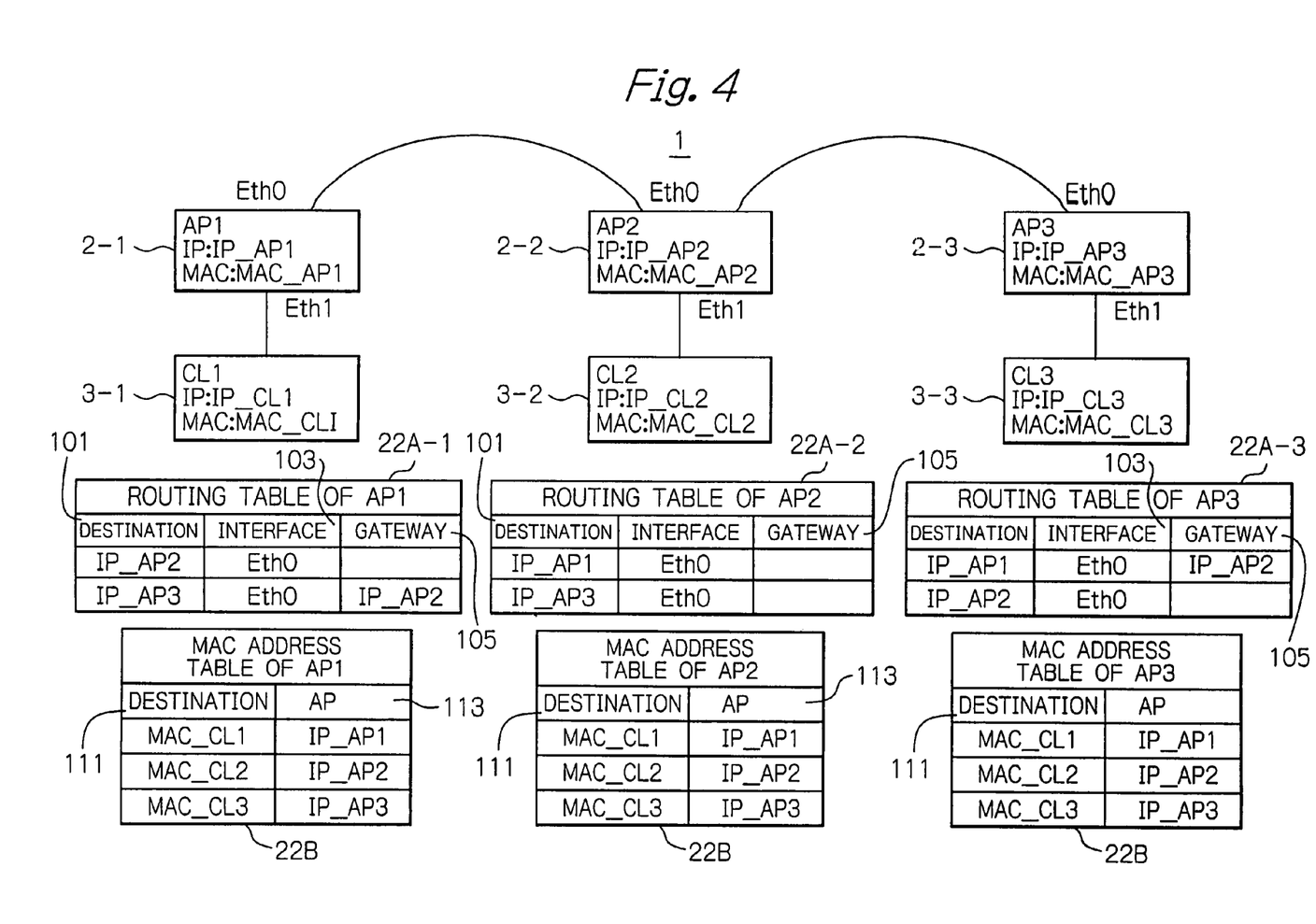
FIG. 4 shows in a diagrammatic view an exemplified configuration of the wireless LAN system of the embodiment together with specific contents of the tables owned by the access points.

In the network system 1 shown in FIG. 4, the wireless LAN device 3-1 formulates a data frame, and modulates wireless signals with the so formulated data frame at a predetermined frequency to transmit the resulting signals in the form of electro-magnetic waves. Although a variety of communication systems may be used for the wireless communication system for transmission between the wireless LAN device 3-1 and the device side wireless LAN transceiver 23-1, the communication system may preferably be used which is prescribed by IEEE 802.11, such as IEEE 802.11a, 802.11b or 802.11g.

Figure 5:
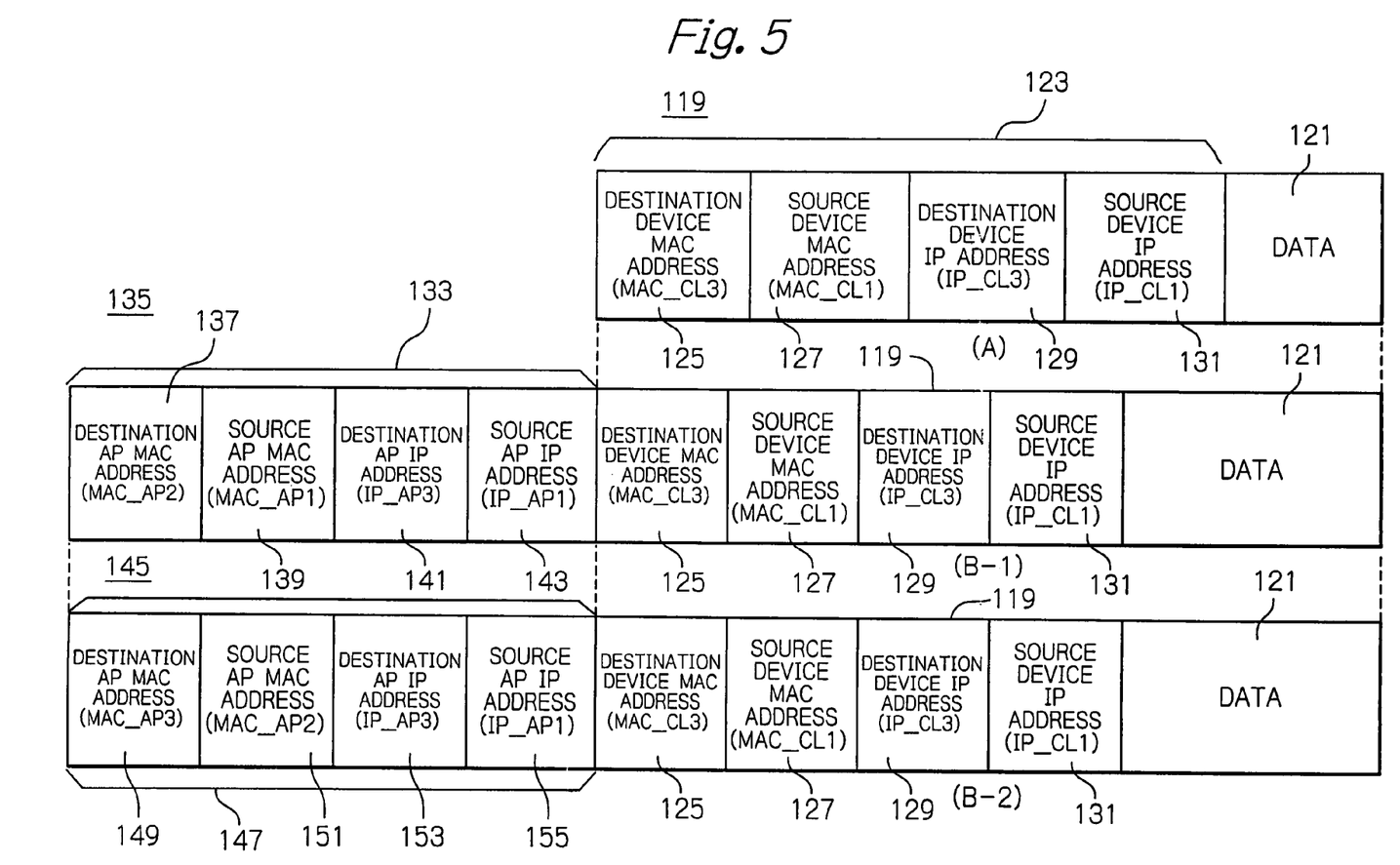
FIG. 5 shows an example of formats of data frames of the embodiment.

FIG. 5, part (A), schematically depicts an exemplary configuration of a data frame 119 formulated by the wireless LAN device 3-1. The exemplary configuration or format of the data frame 119 in the wireless LAN device 3-1 shown in FIG. 5, part (A), may be divided into a data field 121 and a header field 123. As seen from the figure, the header field 121 comprises the subfields of the destination MAC address 125, the MAC address of the source of transmission 127, the destination IP address 129 and the IP address of the source of transmission 131. In the present embodiment, the header field 123 is termed the device side network header information. When the wireless LAN device 3-1 transmits data to the wireless LAN device 3-3, the device 3-1 formulates the data frame 119 with its header 123 containing the destination MAC address 125 of MAC_CL2, the source MAC address 127 of MAC_CL1, the destination IP address 129 of IP_CL3 and the source IP address of IP_CL1, as exemplarily depicted.

Figure 6:
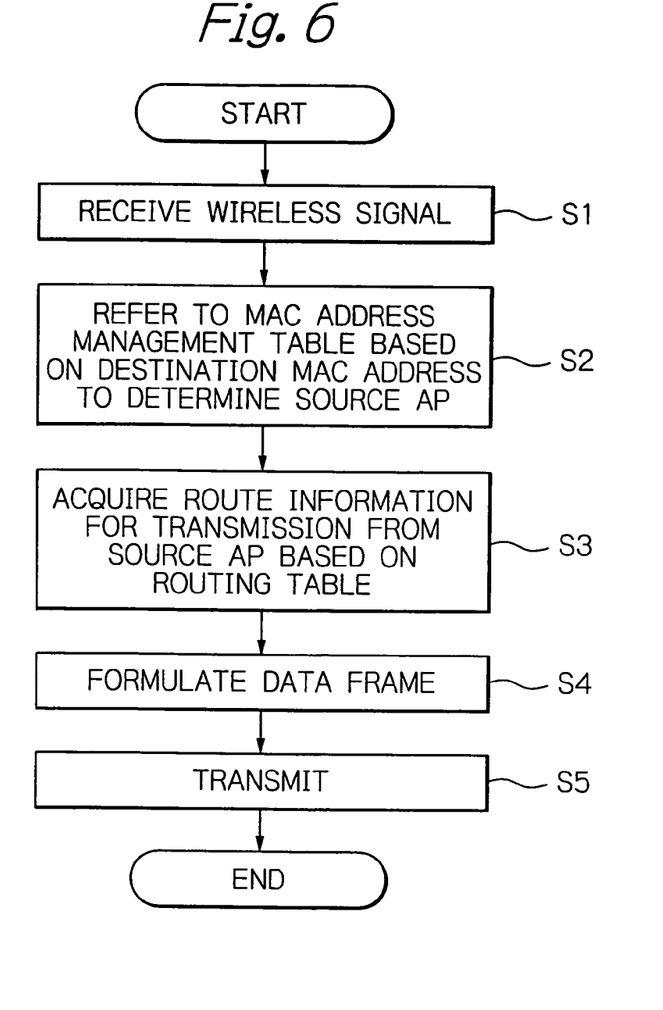
FIG. 6 is a flowchart useful for understanding the operation of the access point of the embodiment.

The wireless signals, transmitted from the wireless LAN device 3-1, are captured by the device side transceiver 23-1 of the access point 2-1. This is shown in FIG. 6 as step S1, which figure is a flowchart showing the operation in the access point 2.

On receipt of the wireless signals, the device side wireless LAN transceiver 23-1 takes out the destination MAC address (MAC_CL3) 125 and the Source MAC address (MAC_CL1) 127, contained in the received signal, and delivers the destination MAC address 125 and the Source MAC address 127 to the inter-AP virtual LAN switch 22-1. The inter-AP virtual LAN switch 22-1 refers to the address management table 22B to take out the identification information of the access point relating to the destination MAC address 125. In short, the access point 2-3 is decided to which the wireless LAN device 3-3 is to be connected, step S2.

Since the MAC address management table 22B is owned in common by the totality of the access points 2, architecting the wireless LAN system 1, the access point 2-1 to which the wireless LAN device 3-1 functioning as the source of transmission is connected can determine the access point 2-3 which the wireless LAN device 3-3 serving as the destination of transmission is connected to.

When the inter-AP virtual LAN switch 22-1 has decided on the access point 2-3 as the destination of transmission, the inter-AP virtual LAN switch 22-1 acquires, based on the routing table 22A-1, the routing information for transmission to the access point 2-3 as the destination of transmission, step S3.

Upon acquisition of the routing information on the path to the access point 2-3 serving as the destination of transmission, the inter-AP virtual LAN switch 22-1 accords a header 133, derived from the routing information, to the communication data 119, step S4, to formulate a data frame 135.

FIG. 5, part (B-1), shows an exemplary structure of the data frame 135 formulated by the inter-AP virtual LAN switch 22-1. As shown in part (B-1), the inter-AP virtual LAN switch 22-1 further appends the AP side network header information 133 to the data frame 119, in order to render possible the communication across the access points 2. Based on the routing table 22A-1, the inter-AP virtual LAN switch 22-1 formulates the data frame 135 to be sent to the access point 2-3 serving as the destination of transmission with the header 133 attached to the data frame 119 transmitted from the access point 2-1 to the access point 2-2. The header 133 includes, as illustrated, the fields of the destination MAC address 137 of MAC_AP2, the source MAC address 139 of MAC_AP1, the destination IP address 141 of IP_AP3 and the source IP address 143 of IP_AP1.

When the data frame 135 has been formulated by the inter-AP virtual LAN switch 22-1, the so formulated data frame is sent to the network side transceiver 21-1, which then transmits the data frame 135 in accordance with the communication system of the network system, step S5.

Specifically, when data to be transmitted between the wireless LAN devices 3-1 and 3-3 are transmitted or relayed between the access points 2, the inter-AP virtual LAN switch 22-1 of the access point 2-1, serving as a source of transmission, formulates the data frame 135, obtained by wrapping the MAC frame 119, FIG. 5, part (A), transmitted between the wireless LAN devices 3 with a frame of another communication layer, and transmits the data frame 135 so wrapped.

The communication data 135, transmitted from the access point 2-1, is in turn received by the network side transceiver 21-2 of the access point 2-2 in the example. In the network side transceiver 21-2, the AP side network header information 133, contained in the header information of the communication data 135, is taken out and delivered to the inter-AP virtual LAN switch 22-2. The inter-AP virtual LAN switch 22-2 uses the AP side network header information to reference the routing table 22A-2. For transmitting the data frame 135, transmitted from the access point 2-1, to the access point 2-3, the inter-AP virtual LAN switch 22-2 formulates, based on the routing table 22A-2, a data frame 145 having its header 145 substituted. In the header 147, as shown in part (B-2), the destination MAC address 149 is MAC_AP3, the source MAC address 151 is represented by MAC_AP2, the destination IP address 153 is IP_AP3 and the source IP address 155 is IP_AP1. The resulting communication data 145 will be transmitted to the network side transceiver 21-2. The network side transceiver 21-2 sends out the thus formulated data frame 145 to the access point 2-3 over the wireless medium.

The data frame 145, thus transmitted from the access point 2-2, is received by the network side transceiver 21-3 of the access point 2-3. From the data frame 145, received by the network side transceiver 21-3, the header information 147 is taken out by the network side transceiver 21-3 and sent to the inter-AP virtual LAN switch 22-3. Based on the AP side network header information 147, the inter-AP virtual LAN switch 22-3 verifies the data to be data addressed to the device in question 2-3, and accordingly takes in the communication data 145.

When the communication data 145 have been taken in by the inter-AP virtual LAN switch 22-3, the inter-AP network header information, contained in the header information field 147, is separated from the header information field 147 by the inter-AP virtual LAN switch 22-3, and the resulting communication data 119 are sent to the device side wireless LAN transceiver 23-3. That is, the communication data of the data frame 119, shown in part (A), is sent to the device side wireless LAN transceiver 23-3.

The device side wireless LAN transceiver 23-3 transmits the communication data 119, supplied thereto from the inter-AP virtual LAN switch 22-3, to the wireless LAN device 3-3, in accordance with the communication system prescribed in the network, such as IEEE 802.11, such as IEEE802.11a, 802.11b or 802.11g, in order to deliver the communication data 119 to the latter device 3-3.

Figure 7:
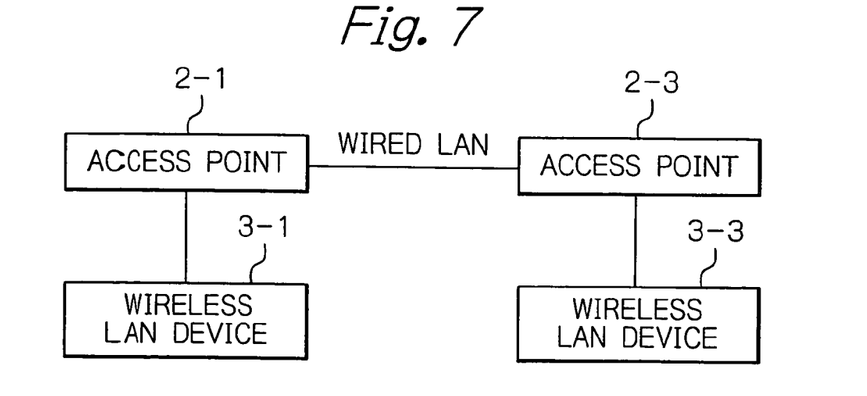
FIG. 7 is a schematic view useful for understanding how the communication operation proceeds between the access points of the embodiment.

Thus, the device side network header information 133, different from that used in the transmission between access points, or AP side header information, 123 is added to the data frame 119 for transmission. That causes, as shown for example in FIG. 7, the two wireless LAN devices 3-1 and 3-2 connected to each other to virtually view the communication established between the access points 2-1 and 2-3 in the form of wired LAN.

Figure 8:
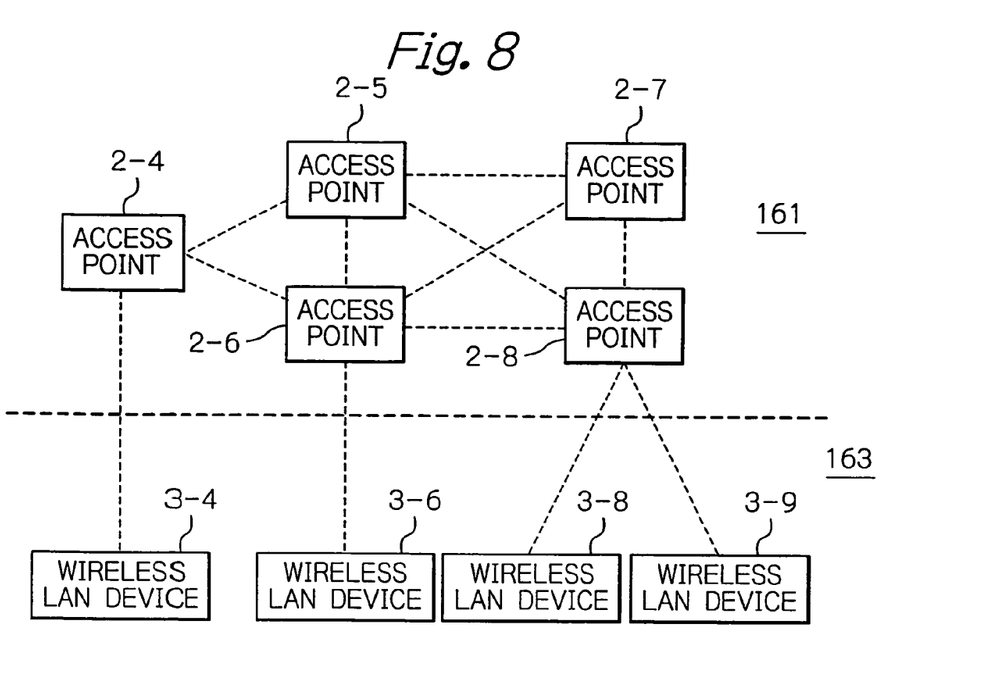
FIG. 8 schematically shows the network structure of the embodiment.

If the access points performing the function and operation stated above are arranged in multiple as shown in FIG. 8, for example, the resultant network configuration will be made up by access points 2-4 through 2-8 and the wireless LAN devices 3-4 through 3-9, which are interconnected as illustrated. In the network, there are two different sub-networks, namely an access point side sub-network 161 for dealing with communication between the access points 2-4 through 2-8, and a device side sub-network 163 for handling communication between the access points 2-4 through 2-8 and the wireless LAN devices 3-4 through 3-9, for example. The two sub-networks 161 and 163 are thus interconnected with each other to carry out communication operations.

Figure 9:
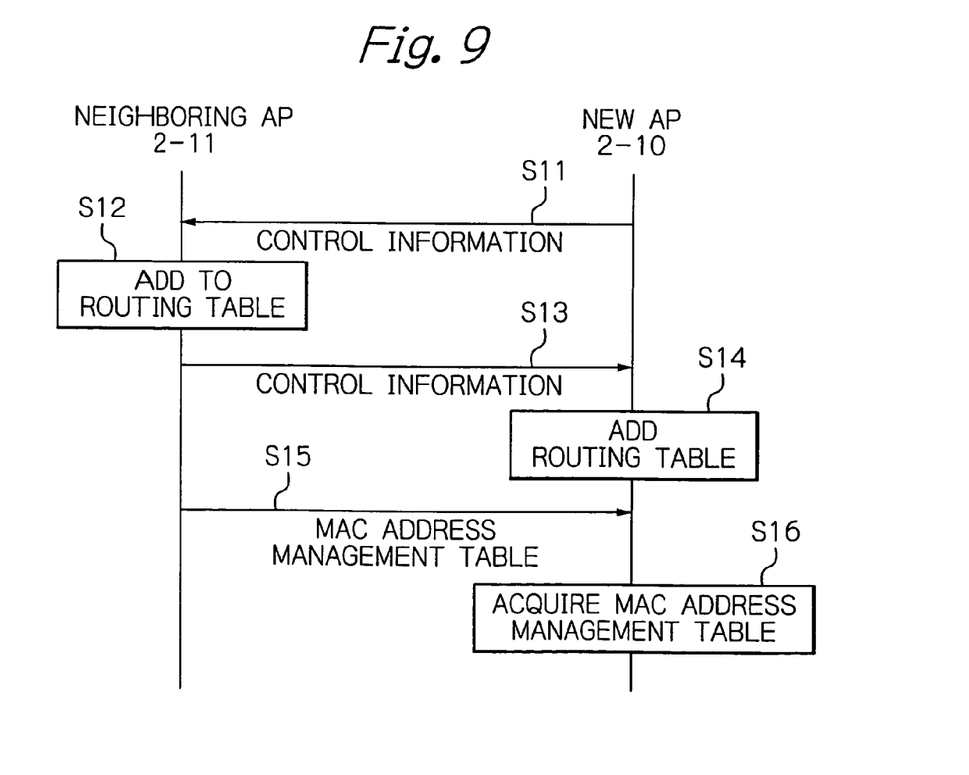
FIG. 9 is a flowchart useful for understanding the operation of the access point when a new access point is involved.

The access points 2 will operate, when one access point 2 is newly added to the wireless LAN system 1, as described below. FIG. 9 shows how data are transmitted between an existing access point 22-11 and another access point 2-10, when newly added in the neighbor of the former. When the access point 2-10 is added on the wireless LAN system 1, the network side transceiver 21-10 of the access point 2-10 periodically transmits control information to accord the control information to the access points 2 neighboring thereto, step S11. This control information is of distributing information owned by the access point, and may include e.g. a HELLO message. In this manner, the neighboring access points may be advised of the fact of the addition of the new access point.

When the neighboring access point 2-11 receives the control information, transmitted from the access point 2-10, the neighboring access point device 2-11 adds, based on the so received control information, the information pertinent to the access point 2-10 to a routing table 22A-11 of the access point 2-11 of the device in question 2-11, step S12.

Also, the neighboring access point 2-11 periodically transmits the control information. The access point 2-10 captures the control information transmitted from the neighboring access point 2-10 to formulate a routing table 22B-10 of the access point device in question 2-10 in accordance with a prescribed protocol for preparation of the routing table, such as OLSR protocol or AODV protocol RIP, steps 13 and 14.

The neighboring access point 2-11 also transmits data of its MAC address management table 22B to the access point 2-10, step S15. The access point 2-10, having received the data of the MAC address management table 22B, is able to utilize the data of the MAC address management table 22B owned in common by the access points 2 on the wireless LAN system 1, step S16.

The neighboring access point 2-11 updates its routing table 22A-11, and further notifies the remaining access points of that effect. That causes the totality of the access points 2 on the network 1 to co-own the information. Thus, when the addition of an access point causes a transmission path to be shortened, the shortened path may be determined by and available to the access points in connection therewith.

In FIG. 9, the control information and the MAC address management table data are separately shown from each other in steps S13 and S15. However, the system may be adapted such that the control information includes the information pertinent to the MAC address management table 22B. In addition, so far as the routing table 22A and the MAC address management table 22B are updatable, steps S14 and step S15 may be processed in a reversed order.

Not only the addition but also the deletion of the access point 2 may be dealt with by the operation similar to that described above.

The MAC address management table 22B, co-owned by the access points 2 on the wireless LAN system 1, may be updated in the manner that will be described with reference to FIG. 10. The MAC address management table 22B is updated, for example, when the wireless LAN device 3 moves from the service area, or communication sphere, of one of the access points 2 to which the wireless LAN device 3 has been connected to that of another of the access points 2.

Figure 10:
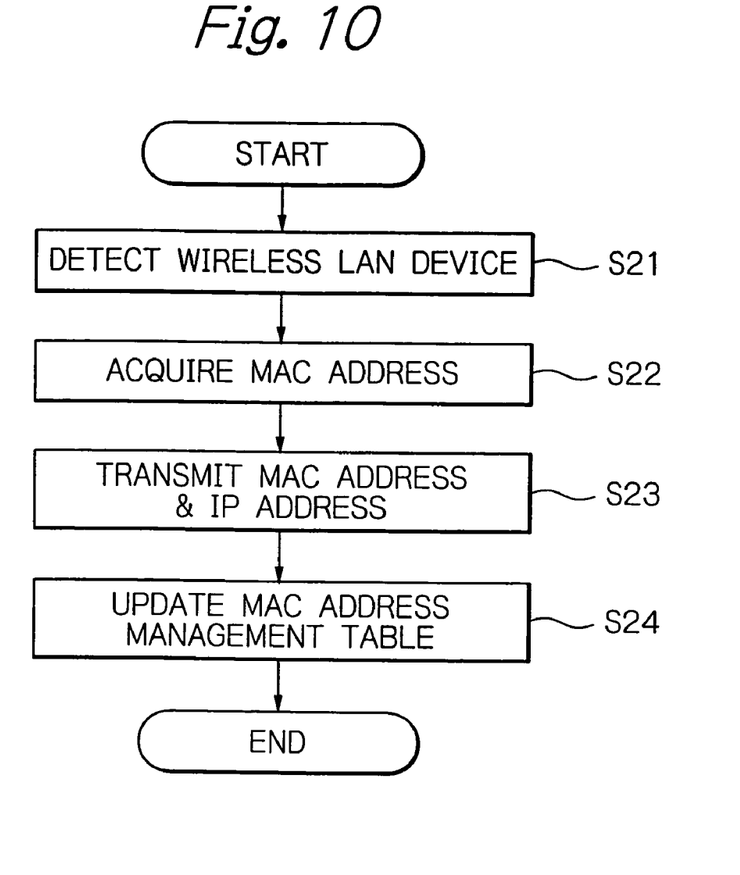
FIG. 10 is a flowchart useful for understanding the operation of the access point when the MAC address management table is updated.

FIG. 10 illustrates the updating operation of the MAC address management table 22B in the access point 2. Initially, the wireless LAN or mobile device 3 moves out of the communication sphere covered by the access point 2 to which it has been connected into the communication sphere of another access point 2 to which the wireless LAN device 3 is to be connected. In general, the wireless LAN device 3 is adapted to receive beacon signals, periodically transmitted by the access point 2, to identify that particular access point 2. For example, the wireless LAN device 3 is adapted for determining one of the access points 2 which has transmitted the beacon signal shaving its reception strength highest among them as a new access point device to be connected in wireless.

When the wireless LAN device 3 has moved into the communication sphere of the new access point 2, this new access point 2 receives the signal transmitted from the wireless LAN device 3 to detect the-wireless LAN device 3.

Upon detection of the wireless LAN device 3, the new access point 2 acquires the MAC address of the wireless LAN device 3, from the signal received from the wireless LAN device 3, step S22. The access point 2 then transmits the information, including the MAC address of the wireless LAN device 3 and the IP address of the own access point 2, to the neighboring access points 2, step S23.

Also, the new access point 2 updates its MAC address management table 22B such that the IP address of that access point is correlated with the MAC address of the wireless LAN device 3, step S24.

Between the remaining access points 2, this update information is transmitted, so that these access points 2 will update their MAC address management tables 22B.

Figure 11:
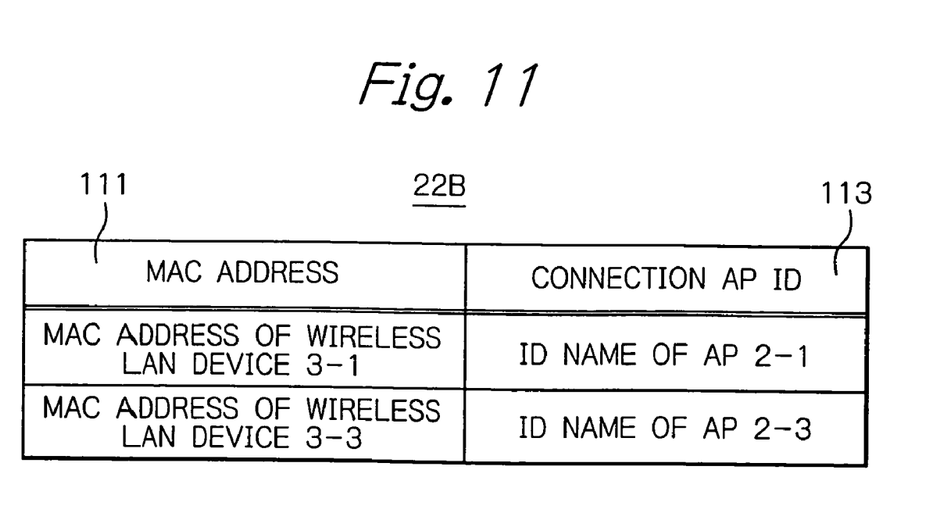
FIG. 11 exemplarily shows the MAC address management table, after updated.

With reference to FIGS. 3 and 11, it will be described how the MAC address management table 22B is updated when the wireless LAN device 3-3, FIG. 1, has moved so as to be allowed to connect to the access point 2-2. By way of example, the contents of the MAC address management table 22B, before updated, are shown in FIG. 3. When the wireless LAN device 3-3 moves, the MAC address management table is updated from the state shown in FIG. 3 to the state shown in FIG. 11, causing the MAC address of the wireless LAN device 3-3, thus having moved, to be in keeping with the access point 2-2.

As described above, the MAC address management table 22B is updated, and the MAC address management table 22B thus updated is used to establish data communication for the wireless LAN device 3.

With use of the access points 2 of the instant embodiment, described above, the following advantages are achieved. With the illustrative embodiment, in which there are provided the MAC address management table 22B, owned in common by the access points 2 on the network 1, and the routing table 22A for routing the access points 2, the access point 2 connected to the wireless LAN device 3 of the destination is able to recognize or determine a transmission path to the wireless LAN device 3 of the destination and the access point 2 associated therewith.

Hence, when the access point 2 is dynamically added or deleted, or the transmission path is changed as a result of movement of the wireless LAN device 3, the update of the routing table contained in the wireless LAN devices at the distal end as done with the conventional system is not required, thus eliminating temporary interruption or disconnection of the communication otherwise encountered at the time of updating the transmission path.

Moreover, with the present embodiment, it is possible, with use of the two sorts of tables, namely the MAC address management table 22B and inter-AP routing table 22A, to carry out the communication in such a manner that the AP side network and the device side network will operate as different networks from each other.

Thus, in carrying out communication between the wireless LAN devices 3, the transmission path between the access points may be shielded from others, with the consequence that the path of possible invasion by a third party into the inside of the network between the access points 2 may be decreased to improve the security.

Since the networks may be made distinct or separate from each other, communication parameters, such as the optimum transmission rate or the electrical field strength, may be set independently, so that the respective networks will be of different characteristics, thereby enhancing the network utilization efficiency.

Moreover, with the illustrative embodiment, in which the access points 2 own the MAC address management table 22B in common, when the movement of the wireless LAN device 3 causes the access point 2 to which the wireless LAN device 3 is to be connected to be shifted from one to another, the wireless LAN device 3 may keep to use the same IP address, with the result that it is unnecessary to change the setting for network connection in the wireless LAN device 3.

The illustrative embodiment above-described is directed to the wireless LAN system comprised of the wireless mesh network, and description has been made on the exemplary communication protocols, settings and standards. However, the present invention maybe applied without any limitations on the communication protocols, settings and standards so far as the totality of the wireless access devices is adapted to commonly own information for supervising or managing the connection states thereof.

In the illustrative embodiment described above, the inter-AP virtual LAN switch 22 has two sorts of tables, MAC address management table 22b and inter-AP routing table 22A. In an application in which the MAC address management table 22B is adapted to include as the connection access point identification information 113 the name of the access points 2 as shown in FIG. 3, however, a table may be provided which is adapted for co-relating the access point names with the IP addresses in order to determine the IP addresses of the access points. That allows the MAC address management table listing the name of the access points to be used at the access point in question to directly specify the IP address of the access points of the destination of transmission.

With the illustrative embodiment described above, the access points 2 are configured to have the network side transceiver 21 and the device side transceiver 23 separate from the former. Alternatively, these two transceivers may be integrated with each other, in which case the scale of the access point configuration may be reduced.

As described above, the illustrative embodiment is applied to the wireless mesh network effecting wireless transmission between access points. The present invention may also be applied to a telecommunications network entirely or partially implemented by wired connection between the access points.

With the illustrative embodiment described above, the use of the data frames 119, 135 and 145, FIG. 5, causes the access point 2 to separate the access point side network from the device side network. However, the access points may be adapted to separate three or more networks from each other. The latter may be accomplished by providing the header field 133 or 147, FIG. 5, part (B), with additional field of header information on the third network added.

With the illustrative embodiment stated above, the functions of the access point 2 are implemented in the form of hardware, only for convenience in description. In practice, these functions may be implemented by software techniques.

The entire disclosure of Japanese patent application No. 2004-356899 filed on Dec. 9, 2004, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A network switch apparatus comprising:
   a route management table for managing first information on a communication route in a wireless network, the wireless network including a plurality of wireless access devices;
   a connection device management table for managing second information on wireless network devices to be connected to the wireless access devices; and
   a signal transmitter for generating from a received first communication signal a second communication signal, and for transmitting the second communication signal, wherein said signal transmitter includes:
   a wireless access device determiner for using said connection device management table to determine a first one of the wireless access devices which is to be connected to a first one of the wireless network devices when a destination to which the first communication signal is destined is the first wireless network device;
   a route acquirer for acquiring from the first information, information on a second one of the wireless access devices which relays the first communication signal when transmitted to the first wireless access device; and
   a header information adder for adding header information for communication between the wireless access devices to the first communication signal to thereby produce the second communication signal, the header information designating the first wireless access device determined as the destination, and the second wireless access device as a relaying device,
   whereby the second communication signal is relayed by the second wireless access device on a basis of the header information to the first wireless access device.

2. The apparatus in accordance with claim 1, wherein said signal transmitter includes:
   a destination recognizer for recognizing the destination of the first communication signal received from the wireless access device; and
   a header information separator for separating, when the destination of the first communication signal received is the access device in which said apparatus is included, the header information for communication between the wireless access devices from the first communication signal received.

3. The apparatus in accordance with claim 1, further comprising:
   an information receiver for receiving, when a wireless access device is added to, or one of the access devices is removed from, the wireless network, third information on the wireless access device added or removed from another wireless access device located in a vicinity of the wireless access device in which said apparatus is included; and
   a table updater responsive to the third information received for updating said route management table and said connection device management table.

4. The apparatus in accordance with claim 1, further comprising:
   an information receiver for receiving, when the wireless network device moves from one to another of the wireless access devices to which the wireless network device is to be connected, third information transmitted from the wireless access device to be newly connected from another of the wireless access devices which is located in a vicinity of the wireless access device in which said apparatus is included; and
   a connection device management table updater responsive to the third information received for updating said connection device management table.

5. The apparatus in accordance with claim 1, wherein the wireless network is formed as a mesh network.

6. The apparatus in accordance with claim 1, wherein the wireless network works under a standard defined by IEEE (Institute of Electrical and Electronics Engineers) 802.11.

7. The apparatus in accordance with claim 1, wherein the first information includes an IP (Internet Protocol) address of the wireless access devices.

8. The apparatus in accordance with claim 1, wherein the second information includes a MAC (Media Access Control) address of the wireless network devices.

9. The apparatus in accordance with claim 1, wherein said signal transmitter is adapted to receive the first communication signal.

10. A method of switching a wireless network in a network switching system comprising:
    a route management table for managing first information on a communication route in the wireless network, the wireless network including a plurality of wireless access devices;
    a connection device management table for managing second information on wireless network devices to be connected to the wireless access devices; and
    a signal transmitter for generating from a received first communication signal a second communication signal, and for transmitting the second communication signal,
    wherein said method comprises the steps of:
    using the connection device management table to determine first one of the wireless access devices which is to be connected to first one of the wireless network devices when a destination to which the first communication signal is destined is the first wireless network device;
    acquiring from the first information, information on second one of the wireless access devices which relays the first communication signal when transmitted to the first wireless access device;
    adding header information for communication between the wireless access devices to the first communication signal to thereby produce the second communication signal, the header information designating the first wireless access device determined as the destination and the second wireless access device as a relaying device; and relaying the second communication signal by the second wireless access device on a basis of the header information to the first wireless access device.

11. A wireless access device comprising a network switch apparatus, which comprises:
    a route management table for managing first information on a communication route in a wireless network, the wireless network including a plurality of wireless access devices;
    a connection device management table for managing second information on wireless network devices to be connected to the wireless access devices; and
    a signal transmitter for generating from a received first communication signal a second communication signal, and for transmitting the second communication signal,
    wherein said signal transmitter includes:
    a wireless access device determiner for using said connection device management table to determine first one of the wireless access devices which is to be connected to first one of the wireless network devices when a destination to which the first communication signal is destined is the first wireless network device;
    a route acquirer for acquiring from the first information, information on second one of the wireless access devices which relays the first communication signal when transmitted to the first wireless access device; and
    a header information adder for adding header information for communication between the wireless access devices to the first communication signal to thereby produce the second communication signal, the header information designating the first wireless access device as the destination and the second wireless access device as a relaying device,
    access control being performed with a communication layer with the wireless access devices other than the wireless access device in which said apparatus is included separate from a communication layer with the wireless network devices connectable to the wireless access device in which said apparatus is included,
    whereby the second communication signal is relayed by the second wireless access device on a basis of the header information to the first wireless access device.

12. A wireless network system including a plurality of wireless access devices each connectable to a wireless network device, wherein said wireless access device comprises a network switch apparatus, which comprises:
    a route management table for managing first information on a communication route in a wireless network, the wireless network including a plurality of wireless access devices;
    a connection device management table for managing second information on wireless network devices to be connected to the wireless access devices; and
    a signal transmitter for generating from a received first communication signal a second communication signal, and for transmitting the second communication signal,
    wherein said signal transmitter includes:
    a wireless access device determiner for using said connection device management table to determine a first one of the wireless access devices which is to be connected to a first one of the wireless network devices when a destination to which the first communication signal is destined is the first wireless network device;
    a route acquirer for acquiring from the first information, information on a second one of the wireless access devices which relays the first communication signal when transmitted to the first wireless access device; and
    a header information adder for adding header information for communication between the wireless access devices to the first communication signal to thereby produce the second communication signal, the header information designating the first wireless access device determined as the destination and the second wireless access device as a relaying device,
    access control being performed with a communication layer with the wireless access devices other than the wireless access device in which said apparatus is included separate from a communication layer with the wireless network devices connectable to the wireless access device in which said apparatus is included
    whereby the second communication signal is relayed by the second wireless access device on a basis of the header information to the first wireless access device.

* * * * *

UNITED STATES PATENT AND TRADEMARK OFFICE
CERTIFICATE OF CORRECTION

| | | |
|---|---|---|
| PATENT NO. | : 7,664,111 B2 | Page 1 of 1 |
| APPLICATION NO. | : 11/296395 | |
| DATED | : February 16, 2010 | |
| INVENTOR(S) | : Azuma Tsubota | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Thirtieth Day of November, 2010

David J. Kappos
*Director of the United States Patent and Trademark Office*